US007845550B2

(12) United States Patent
Hirano

(10) Patent No.: US 7,845,550 B2
(45) Date of Patent: Dec. 7, 2010

(54) COMMUNICATION TERMINAL DEVICE

(75) Inventor: Yuji Hirano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 196 days.

(21) Appl. No.: 11/802,655

(22) Filed: May 24, 2007

(65) Prior Publication Data

US 2007/0272741 A1 Nov. 29, 2007

(30) Foreign Application Priority Data

May 29, 2006 (JP) ............................ 2006-148614

(51) Int. Cl.
*G06F 17/00* (2006.01)
*G06K 19/06* (2006.01)

(52) U.S. Cl. ....................... 235/375; 235/379; 235/380; 235/383; 235/492; 235/451

(58) Field of Classification Search ................. 235/380, 235/375, 383, 379

See application file for complete search history.

(56) References Cited

U.S. PATENT DOCUMENTS

| | | | | |
|---|---|---|---|---|
| 5,010,238 | A * | 4/1991 | Kadono et al. | 235/379 |
| 5,477,037 | A * | 12/1995 | Berger | 235/379 |
| 5,530,232 | A * | 6/1996 | Taylor | 235/380 |
| 5,578,808 | A * | 11/1996 | Taylor | 235/380 |
| 5,604,824 | A * | 2/1997 | Chui et al. | 382/248 |
| 5,783,808 | A * | 7/1998 | Josephson | 235/379 |
| 6,182,891 | B1 * | 2/2001 | Furuhashi et al. | 235/379 |
| 2004/0017476 | A1 * | 1/2004 | Nagashima et al. | 348/207.2 |
| 2004/0145973 | A1 * | 7/2004 | Nagashima | 368/107 |
| 2005/0261967 | A1 * | 11/2005 | Barry et al. | 705/16 |
| 2005/0279824 | A1 * | 12/2005 | Anderson et al. | 235/380 |
| 2005/0283735 | A1 * | 12/2005 | Ferlitsch et al. | 715/771 |
| 2006/0015804 | A1 * | 1/2006 | Barton et al. | 715/503 |
| 2008/0301544 | A1 * | 12/2008 | Davidson et al. | 715/234 |
| 2009/0006239 | A1 * | 1/2009 | Robinson et al. | 705/35 |

FOREIGN PATENT DOCUMENTS

| | | |
|---|---|---|
| JP | 2003-022479 | 1/2003 |
| JP | 2003-178245 | 6/2003 |
| JP | 2003-203274 | 7/2003 |
| JP | 2004-167993 | 6/2004 |
| JP | 2005-038351 | 2/2005 |
| WO | 97/41540 | 11/1997 |

* cited by examiner

*Primary Examiner*—Thien M. Le
*Assistant Examiner*—Tuyen K Vo
(74) *Attorney, Agent, or Firm*—Kubotera & Associates LLC

(57) ABSTRACT

A communication terminal device is connected to an information processing apparatus that controls history information of a medium in which identification information is stored. The communication terminal device includes a reading unit for reading the identification information stored in the medium; a communication unit for transmitting the identification information thus read to the information processing apparatus and receiving the history information corresponding to the identification information from the information processing apparatus; a display unit for displaying the history information; a history selection unit for selecting specific history information from the history information; a format storage unit for storing a plurality of print formats; a format selection unit for selecting a specific print format from the print formats; and a printing unit for merging the specific history information thus selected with the specific print format thus selected to be printed.

16 Claims, 17 Drawing Sheets

41a

| Activity date | Card ID | Product ID | Amount | Payment destination ID |
|---|---|---|---|---|
| 2006/02/01 13:05. 30" | 10012340 | 453958348 | 410 | 787342379 |
| 2006/02/01 13:05. 30" | 00348329 | 562375734 | 80 | 382523897 |
| 2006/02/01 13:05. 30" | 37583701 | 049593032 | 4780 | 775439083 |
| 2006/02/01 13:05. 30" | 52383828 | 456954860 | 770 | 276347482 |
| 2006/02/01 13:05. 30" | 35823704 | 347623490 | 210 | 743975892 |
| 2006/02/01 13:05. 30" | 38578237 | 098989566 | 1450 | 239070237 |
| 2006/02/01 13:05. 31" | 56875675 | 000934374 | 5000 | 549547348 |

FIG. 2 (a)

41b

| Card ID | State | User name |
|---|---|---|
| 10012340 | 1 | AAA |
| 00348329 | 1 | BBB |
| 37583701 | 1 | CCC |
| 52383828 | 1 | DDD |
| 35823704 | 1 | EEE |
| 38578237 | 0 | FFF |
| 56875675 | 1 | GGG |

FIG. 2 (b)

(c)

41c

| Product ID | Product name |
|---|---|
| 0000000001 | Beer |
| 0000000002 | Drink |
| 0000000003 | Cigarette |
| 0000000004 | Train ticket |
| 0000000005 | Book |
| 0000000006 | Magazine |
| 0000000007 | Tool |

FIG. 2 (c)

41d

| Payment destination ID | Payment destination |
|---|---|
| 0000100000 | aaa |
| 0000200000 | bbb |
| 0000300000 | ccc |
| 0000400000 | ddd |
| 0000500000 | eee |
| 0000600000 | fff |
| 0000700000 | ggg |

FIG. 2 (d)

42a

| Activity date | Product name | Amount | Selection state | Product ID | Payment destination ID |
|---|---|---|---|---|---|
| 2006/02/01 13:05. 30' | Train ticket | 210 | 1 | 453958348 | 0000100000 |
| 2006/02/01 18:27. 38' | Train ticket | 450 | 1 | 453958348 | 0000100000 |
| 2006/02/01 19:21. 12' | Cigarette | 300 | 0 | 049593032 | 0000500000 |
| 2006/02/02 13:04. 58' | Train ticket | 210 | 1 | 543958348 | 0000100000 |
| 2006/02/02 19:02. 00' | Train ticket | 210 | 1 | 453958348 | 0000100000 |
| 2006/02/03 12:43. 30' | Book | 1480 | 0 | 098989566 | 0000500000 |
| 2006/02/03 13:02. 31' | Train ticket | 210 | 1 | 000934374 | 0000100000 |

FIG. 3 (a)

42b

| User name | Date |
|---|---|
| EEE | 20060217 |

FIG. 3 (b)

42c

| Payment destination ID | Payment destination name |
|---|---|
| 0000100000 | aaa |
| 0000500000 | eee |

FIG. 3 (c)

| Form type | Selection state |
|---|---|
| Receipt | 1 |
| Bill | 0 |
| History detail | 1 |
| ⋮ | ⋮ |

46

History Detail

Issue date: February 17, 2006

| Date | Product name | Amount |
|---|---|---|
| 2006/02/01 | Train ticket | 210 |
| 2006/02/01 | Train ticket | 450 |
| 2006/02/02 | Train ticket | 210 |
| 2006/02/02 | Train ticket | 210 |
| 2006/02/03 | Train ticket | 210 |
| 2006/02/03 | Train ticket | 210 |
| | | |
| | | |
| | | |
| | | |
| Total | | 1,500 |

Issuer XXXX company

FIG. 7

47

Receipt

Attention: Mr. EEE

Amount ¥1,500

Received on February 17, 2006

XXXX company

FIG. 8

COMMUNICATION TERMINAL DEVICE

BACKGROUND OF THE INVENTION AND RELATED ART STATEMENT

The present invention relates to a communication terminal device having a printing function and capable of reading identification information stored in a medium.

In a conventional system, an activity history of an electrical money is stored in a server installed at an electrical money issuance institution. As per request, the activity history is provided to a user of the electrical money (refer to Patent Reference). The user may use a communication terminal device having a printing function to print the activity history provided from a server installed at the electrical money issuance institution, so that the user can check own activity history as necessary.

Patent Reference: Japanese Patent Publication No. 2003-178245

In a conventional communication terminal device, activity history information, which is provided in a list format, is printed in a list format as is. Accordingly, when a user wants to check a specific item, for example, an activity history related only to a specific payment destination or a purchase item, the activity history is printed in the list format including all of the activity history information. Therefore, it is not easy for the user to verify the specific item from the list format, and it is not an efficient way of confirming the activity history. Since the activity history provided in the list format simply lists and displays the activity history information, such a format is useful only for verification purpose.

In view of the problems described above, an object of the present invention is to provide a communication terminal device capable of efficiently printing an activity history for various purposes. In the communication terminal device of the present invention, it is possible to select specific activity history information from activity history information stored in a medium. Then, it is possible to select a specific print format from a plurality of print formats, so that the specific activity history thus selected is printed in the specific print format thus selected.

Further objects and advantages of the invention will be apparent from the following description of the invention.

SUMMARY OF THE INVENTION

In order to attain the objects described above, according to the present invention, a communication terminal device is connected to an information processing apparatus that controls history information of a medium in which identification information is stored.

According to an embodiment of the present invention, the communication terminal device includes a reading unit for reading the identification information stored in the medium; a communication unit for transmitting the identification information thus read to the information processing apparatus and receiving the history information corresponding to the identification information from the information processing apparatus; a display unit for displaying the history information; a history selection unit for selecting specific history information from the history information; a format storage unit for storing a plurality of print formats; a format selection unit for selecting a specific print format from the print formats; and a printing unit for merging the specific history information thus selected with the specific print format thus selected to be printed.

In the communication terminal device of the present invention, the specific history information is selected from the history information stored in the medium. The specific print format is selected from a plurality of the print formats. Then, the specific history information thus selected is merged with the specific print format thus selected to be printed. Accordingly, it is possible to efficiently print the history information. Further, it is easy to identify a specific item, thereby being useful for various purposes.

BRIEF DESCRIPTION OF THE DRAWINGS

FIGS. 2(*a*) to 2(*d*) are schematic views showing formats of history information stored in a history information server according to the first embodiment of the present invention;

FIGS. 3(*a*) to 3(*c*) are schematic views showing formats of the history information of a specific card ID stored in a history information storage unit according to the first embodiment of the present invention;

FIG. 7 is a schematic view showing an example of a history detail according to the first embodiment of the present invention;

FIG. 8 is a schematic view showing an example of a receipt according to the first embodiment of the present invention;

DETAILED DESCRIPTION OF PREFERRED EMBODIMENTS

Hereunder, embodiments of the present invention will be explained with reference to the accompanying drawings.

First Embodiment

Figure 1:
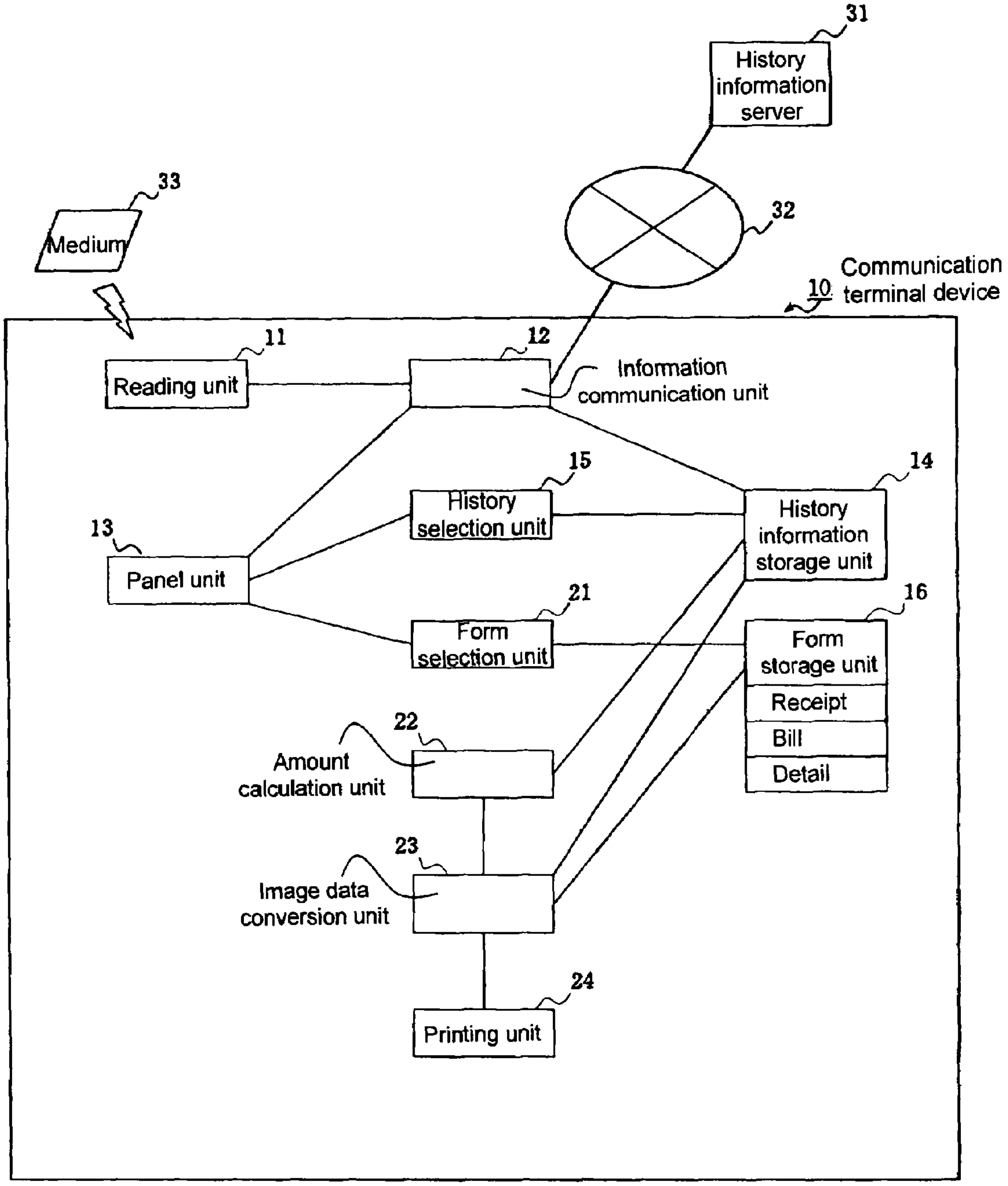
FIG. 1 is a schematic block diagram showing a communication terminal device according to a first embodiment of the present invention.

FIG. 1 is a schematic block diagram showing a communication terminal device 10 according to a first embodiment of the present invention. As shown in FIG. 1, the communication terminal device 10 includes a device having a calculation unit such as a CPU, an MPU, and the likes, and a storage unit such as a semiconductor memory, a magnetic disk, and the likes. The communication terminal device 10 is capable of reading identification information stored in a medium 33, and has a printing function in addition to a communication function.

In the embodiment, the medium 33 includes any type of medium capable of storing the identification information such as an IC card with an IC chip embedded in a plastic card, a mobile phone, a card with a magnetic strip, and the likes. As an example, the medium 33 functions as a transaction medium having an electronic money transaction function.

In the electronic money transaction, a certain monetary value is charged in the electronic card in advance. When a customer conducts a transaction at a shop, i.e., purchasing a good or receiving service, a price of the good or service associated with the transaction can be withdrawn from the electronic card at the shop.

In the embodiment, the communication terminal device 10 is connected through a network 32 to a history information server 31 as an information processing unit administering history information, so that the communication terminal device 10 can communicate with the history information server 31. The history information server 31 is installed at an institution where the electronic card is issued.

In the embodiment, the history information server 31 is a computer having a calculation unit such as a CPU, an MPU, and the likes; a storage unit such as a semiconductor memory, a magnetic disk and the likes; and a communication interface. The history information server 31 administers an activity history of the electronic money and stores the history information. The network 32 is a communication line network of a wired or wireless system. The network 32 includes any type of communication line network such as a local area network (LAN), a wide area network (WAN), an intranet, Internet, and the likes. Further, the network 32 may be formed of a plurality of communication line networks.

As shown in FIG. 1, in the embodiment, the communication terminal device 10 includes a reading unit 11; an information communication unit 12 as a communication unit; a panel unit 13; a history information storage unit 14; a history selection unit 15; a form storage unit 16 as a format storage unit; a form selection unit 21 as a format selection unit; an amount calculation unit 22; an image data conversion unit 23; and a printing unit 24.

In the embodiment, the reading unit 11 is capable of communicating with the medium 33, and reads the identification information stored in the medium 33. Further, the reading unit 11 can read the identification information from the medium 33 when the medium 33 is either a device capable of communicating without contact such as an IC card, a mobile phone, and the likes; or a device capable of communicating with contact such as a card having a magnetic stripe.

In the embodiment, the information communication unit 12 refers a card ID to the history information server 31 as the identification information read by the reading unit 11, and receives the history information corresponding to the card ID from the history information server 31.

In the embodiment, the panel unit 13 includes a display portion such as a liquid crystal display, a light emitting diode display device and the likes; and an input portion such as a ten-key, a function key, a push button, a touch panel, and the likes. The panel unit 13 receives the history information from the history information storage unit 14, and displays the history information on the display portion. It is preferred that the display portion includes a touch panel functioning as the input portion as well. Accordingly, a user can input through touching a screen.

In the embodiment, the history information storage unit 14 stores and holds the history information received by the information communication unit 12 from the history information server 31. When the user inputs through the panel unit 13 to select a history, the history selection unit 15 identifies the history thus selected and updates a selection state of the history information stored in the history information storage unit 14.

In the embodiment, the form storage unit 16 stores and holds print format information of a receipt, an invoice, a history detail, and the likes. The print format information is based on a page description language, and includes form data of print contents in a standard format portion independent from specific information of the user such as a ruled line portion and a title text string.

When the user inputs through the panel unit 13 to select the print format, the form selection unit 21 identifies the print format thus selected and updates a selection state of a form. The amount calculation unit 22 retrieves amount information of the history information in a selected state from the history information stored in the history information storage unit 14, thereby calculating a total amount.

In the embodiment, the image data conversion unit 23 retrieves the print format information in the selected state from the print format information stored in the form storage unit 16. Then, the image data conversion unit 23 retrieves information from the history information storage unit 14 necessary for the print format information thus selected relative to the history information in the selected state in the history information storage unit 14. Further, the image data conversion unit 23 retrieves the total amount thus calculated from the amount calculation unit 22. At last, the image data conversion unit 23 merges the print format information with the information thus retrieved to create print image data.

In the embodiment, the printing unit 24 prints the print image data created by the image data conversion unit 23 on a print medium such as a paper sheet. Note that the printing unit 24 may adopt any printing method including an electro-photography method, an inkjet method, an ink-ribbon method, a thermal transfer method, and the likes.

Next, the following description will be provided: formats of the various information stored in the history information server 31 and the communication terminal device 10, a screen displayed on the panel unit 13, and a print result with the printing unit 24.

FIGS. 2(*a*) to 2(*d*) are schematic views showing the formats of the history information stored in the history information server 31 according to the first embodiment of the present invention. FIGS. 3(*a*) to 3(*c*) are schematic views showing the formats of the history information of a specific card ID stored in the history information storage unit 14 according to the first embodiment of the present invention.

Figure 4:
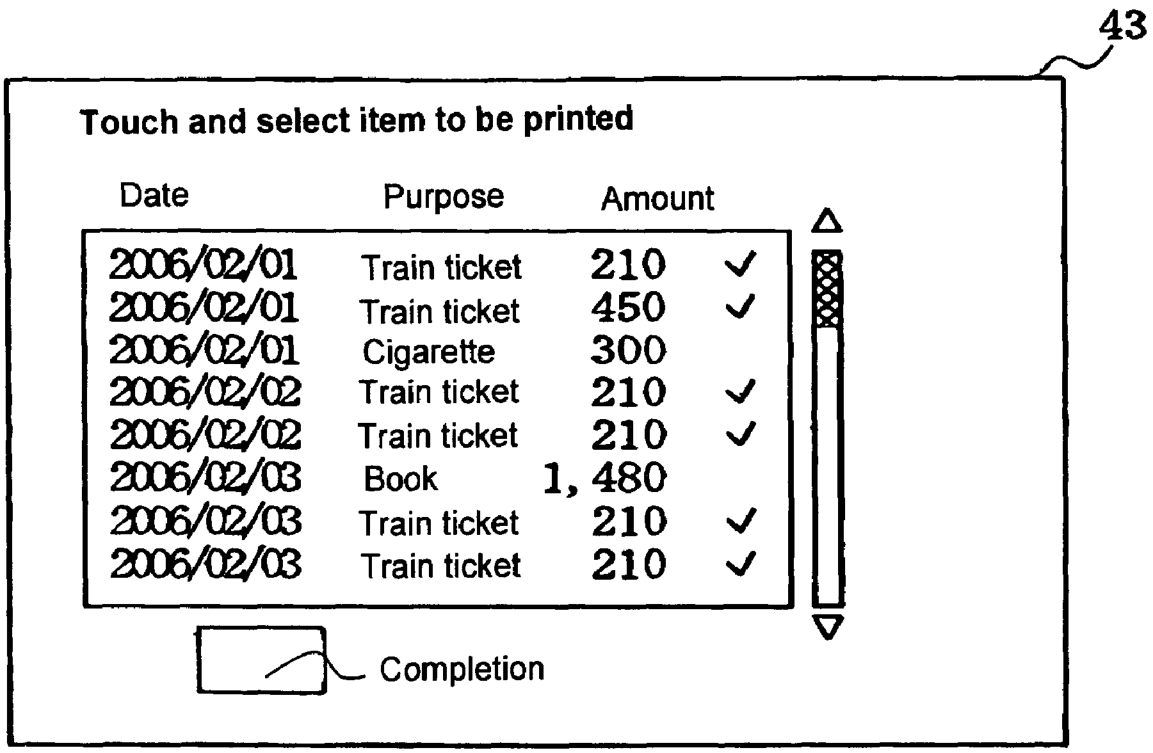
FIG. 4 is a schematic view showing an example of a history selection screen according to the first embodiment of the present invention.
Figures 5, 6:
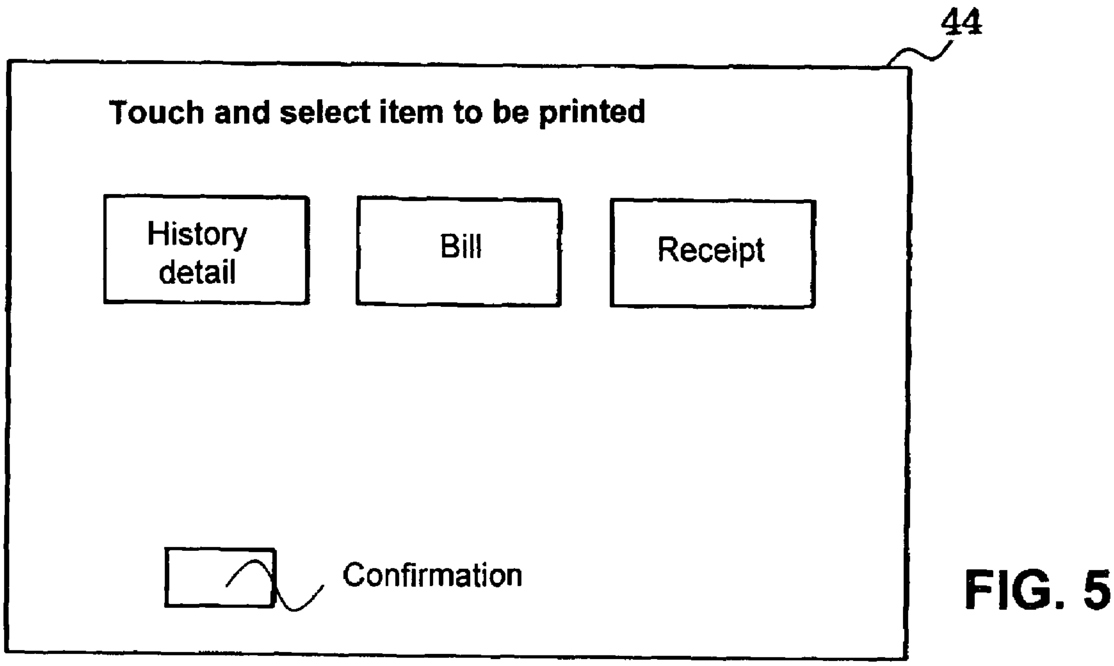
FIG. 5 is a schematic view showing an example of a print format selection screen according to the first embodiment of the present invention.
FIG. 6 is a schematic view showing an example of print format information stored in a form storage unit according to the first embodiment of the present invention.

Further, FIG. 4 is a schematic view showing an example of a history selection screen according to the first embodiment of the present invention. FIG. 5 is a schematic view showing an example of a print format selection screen according to the first embodiment of the present invention. FIG. 6 is a schematic view showing an example of the print format information stored in the form storage unit 16 according to the first embodiment of the present invention. FIG. 7 is a schematic view showing an example of a history detail according to the first embodiment of the present invention.

Figure 9:
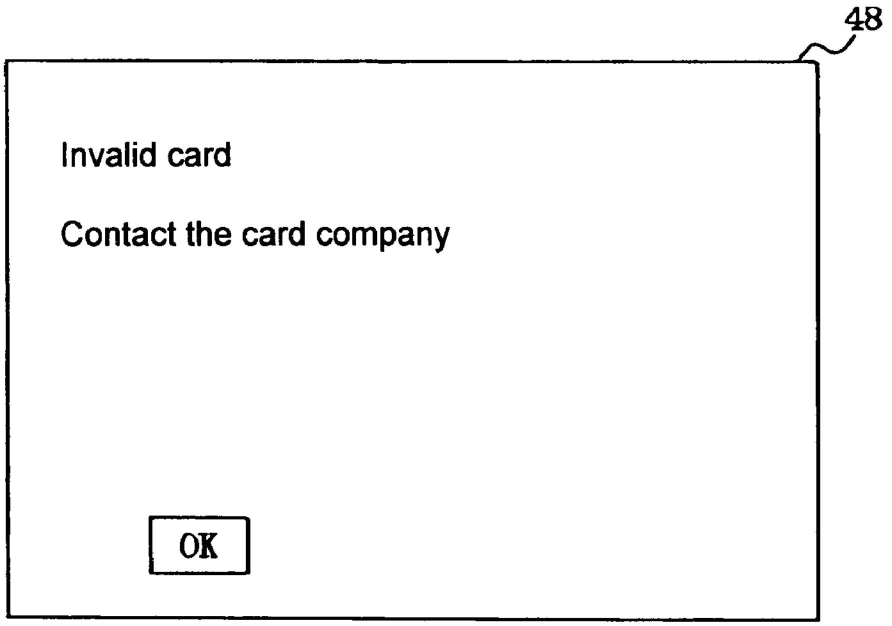
FIG. 9 is a schematic view showing an example No. 1 of a warning screen according to the first embodiment of the present invention.
Figure 10:
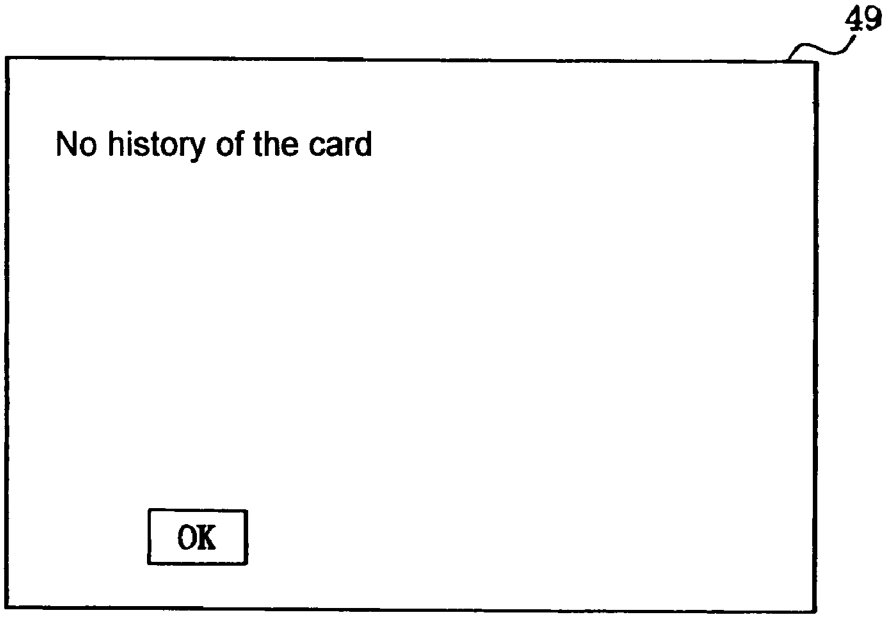
FIG. 10 is a schematic view showing an example No. 2 of the warning screen according to the first embodiment of the present invention.

Still further, FIG. 8 is a schematic view showing an example of a receipt according to the first embodiment of the present invention. FIG. 9 is a schematic view showing an example No. 1 of a, warning screen according to the first embodiment of the present invention. FIG. 10 is a schematic view showing an example No. 2 of the warning screen according to the first embodiment of the present invention.

As shown in FIG. 2(*a*), the history information server 31 includes a history information database 41*a*. The history information database 41*a* stores an activity date; a card ID of the medium 33 as an electronic money card; a product ID identifying an individual product or a purpose; an amount; and a payment destination ID indicating a payment destination to which the amount of money is paid. As shown in FIG. 2(*b*), the history information server 31 further includes a card information database 41*b*. The card information database 41*b* stores the card ID; a state whether the card is valid or invalid; and a user name correspondingly.

Further, as shown in FIG. 2(*c*), the history information server 31 includes a product information database 41*c*. The product information database 41*c* stores the product ID and a product name correspondingly. As shown in FIG. 2(*d*), the history information server 31 further includes a payment destination information database 41*d*. The payment destination information database 41*d* stores the payment destination ID and a payment destination name correspondingly.

In the embodiment, according to the various IDs stored in the history information database 41*a*, the card information database 41*b*, the product information database 41*c*, and the payment destination information database 41*d* are referred, thereby obtaining a text string indicating a name to be displayed on a screen or printed on a print medium.

As described above, the card information database 41*b* stores the state whether the card is valid or invalid. In this case, when the card is valid, the card information database 41*b* stores "1". When the card is invalid, the card information database 41*b* stores "0". For example, when the user cancels the medium 33 due to a stolen card or a lost card, the medium 33 is invalidated.

FIGS. 3(*a*) to 3(*c*) are schematic views showing the formats of the history information of the specific card ID, i.e., the medium 33, stored in the history information storage unit 14.

As shown in FIG. 3(*a*), the history information storage unit 14 includes a history information database 42*a* associated with the medium 33. The history information database 42*a* stores the activity date; the product name; the amount; the selection state of the history information; the product ID; and the payment destination ID. When the history information is not selected, the selection state of the history information is assigned with "0". When the history information is selected, the selection state of the history information is assigned with "1".

Further, as shown in FIG. 3(*b*), the history information storage unit 14 includes a date database 42*b*. The date database 42*b* stores the user name corresponding to the card ID; and a date when the history information is obtained. As shown in FIG. 3(*c*), the history information storage unit 14 further includes a payment destination information database 42*c*. The payment destination information database 42*c* stores the payment destination ID in the history information thus selected, and the payment destination name correspondingly.

As shown in FIG. 4, a display screen 43 is displayed on the panel unit 13 for selecting the history information to be printed. In the display screen 43, there are displayed the history information; an upward scroll button for scrolling the history information upward; a downward scroll button for scrolling the history information downward; a scroll bar for showing a relative current position of the history information displayed relative to all of the history information; and a complete button for directing completion of the selection of the history information. The user can touch the display screen 43 to select the history information to be printed. When the history information is selected, a check mark is added in a selection column of the history information thus selected.

As shown in FIG. 5, a display screen 44 is displayed on the panel unit 13 for selecting the print format of the history information. The user can touch the display screen 44 to select the print format. In the display screen 44, there are displayed buttons indicating printable form types such as the history detail, the receipt, and the invoice; and a confirmation button for indicating completion of the selection.

FIG. 6 is a schematic view showing an example of the print format information stored in the form storage unit 16. As shown in FIG. 6, the form types such as the history detail, the receipt, and the invoice, and selection states thereof are displayed. When the corresponding form type is not selected, the selection state is assigned with "0". When the corresponding form type is selected, the selection state is assigned with "1".

As an example of a print result of the history detail, a history detail 46 is shown in FIG. 7. The contents of the history detail 46 correspond to the history information shown in FIGS. 3(*a*) to 3(*c*). In the history detail 46, a history detail issuance data corresponds to the date when the history information is obtained in the date database 42*b* shown in FIG. 3(*b*). Note that there is retrieved only the history information with the selection state of "1" in the history information database 42*a* shown in FIG. 3(*a*).

In the history detail 46, the activity dates in the history information database 42*a* are shown in a date column; the product names in the history information database 42*a* are shown in a product name column; and the amounts in the history information database 42*a* are shown in an amount column. A total amount, i.e., a total of the amounts of the history information thus selected, is shown at the lowermost cell of the amount column. An issuer is a company indicating the payment destination of the electronic card, and corresponds to a name of the payment destination.

As an example of a print result of the receipt, a receipt 47 is shown in FIG. 8. The contents of the receipt 47 correspond to the history information shown in FIGS. 3(*a*) to 3(*c*). In the receipt 47, an attention corresponds to the user name of the card ID in the date database 42*b* shown in FIG. 3(*b*). The total amount, i.e., a total of the amounts of the history information thus selected, is shown. A receipt date corresponds to the date when the history information is obtained in the date database 42*b*. An issuer name corresponds to the payment destination name in the payment destination information database 42*c* shown in FIG. 3(*c*).

As shown in FIG. 9, when the electronic money card as the medium 33 with the card ID thus read is invalid, a warning screen 48 is displayed on the panel unit 13. In the warning screen 48, an OK button is shown for directing completion of the procedure.

As shown in FIG. 10, when the electronic money card as the medium 33 with the card ID thus read is valid, but there is no history information to be treated, a warning screen 49 is displayed on the panel unit 13. In the warning screen 49, an OK button is shown for directing completion of the procedure.

Figure 11:
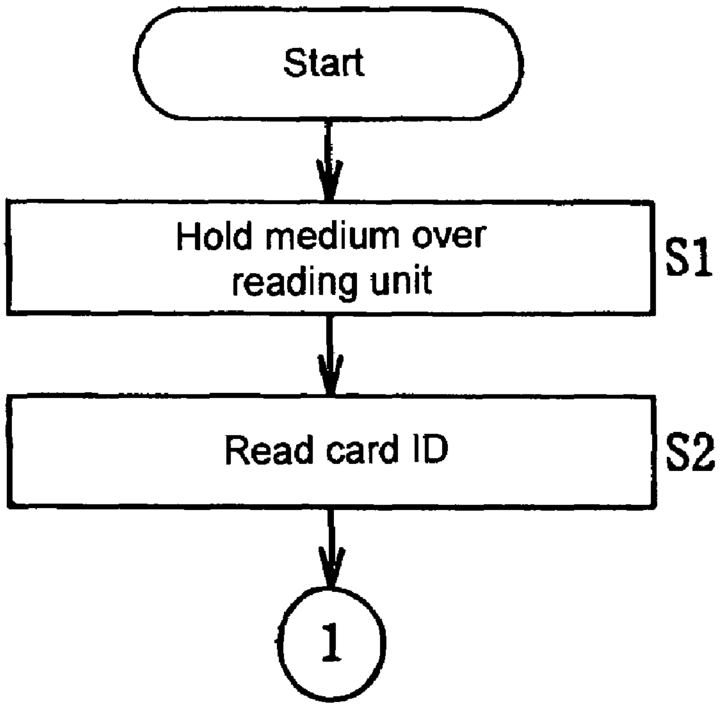
FIG. 11 is a flow chart showing an operation of reading identification information from a medium according to the first embodiment of the present invention.
Figure 12:
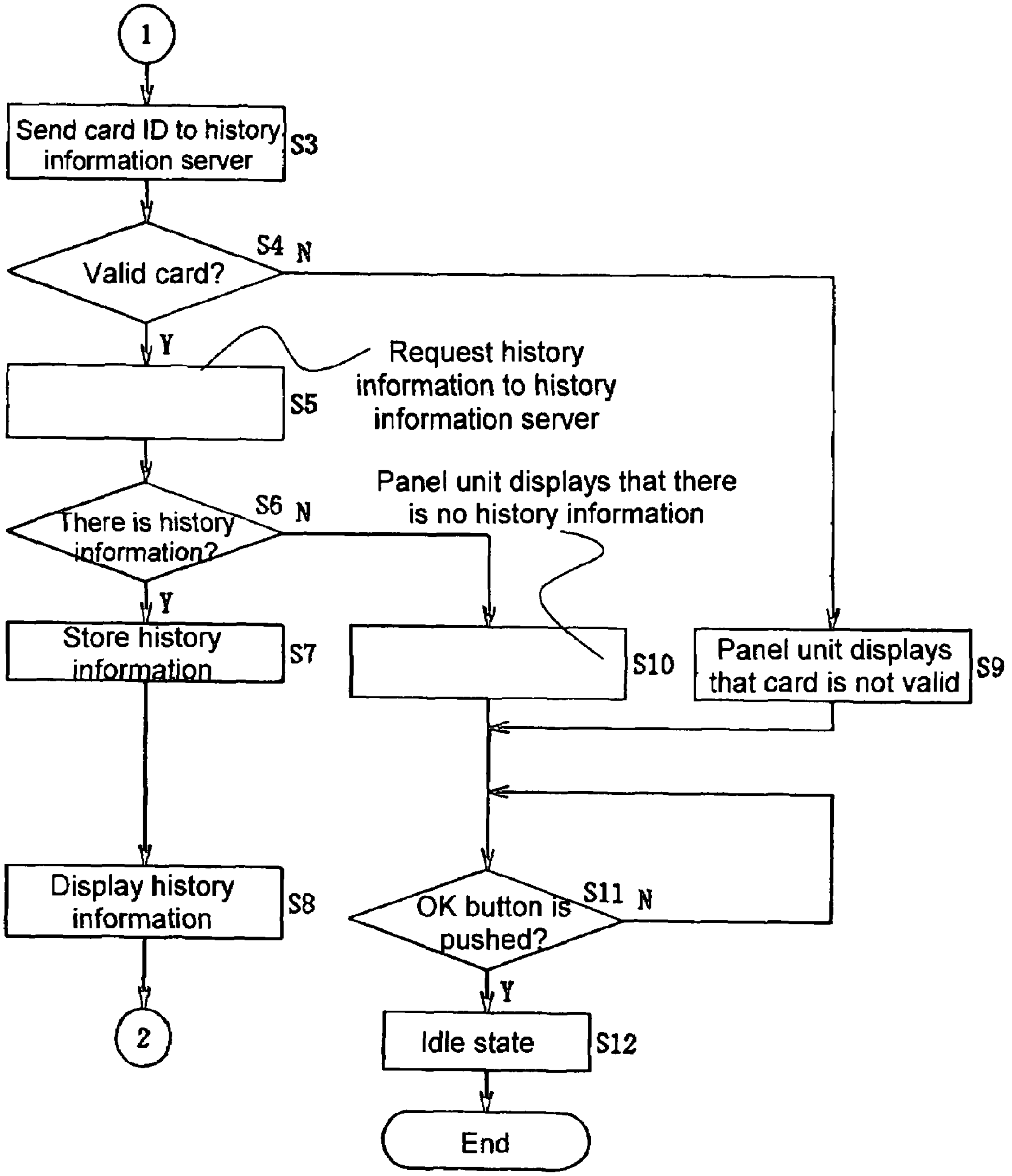
FIG. 12 is a flow chart showing an operation of obtaining the history information from the history information server according to the first embodiment of the present invention.

An operation of the communication terminal device 10 will be explained next. FIG. 11 is a flow chart showing an operation of reading identification information from the medium 33 according to the first embodiment of the present invention. FIG. 12 is a flow chart showing an operation of obtaining the history information from the history information server 31 according to the first embodiment of the present invention.

Figure 13:
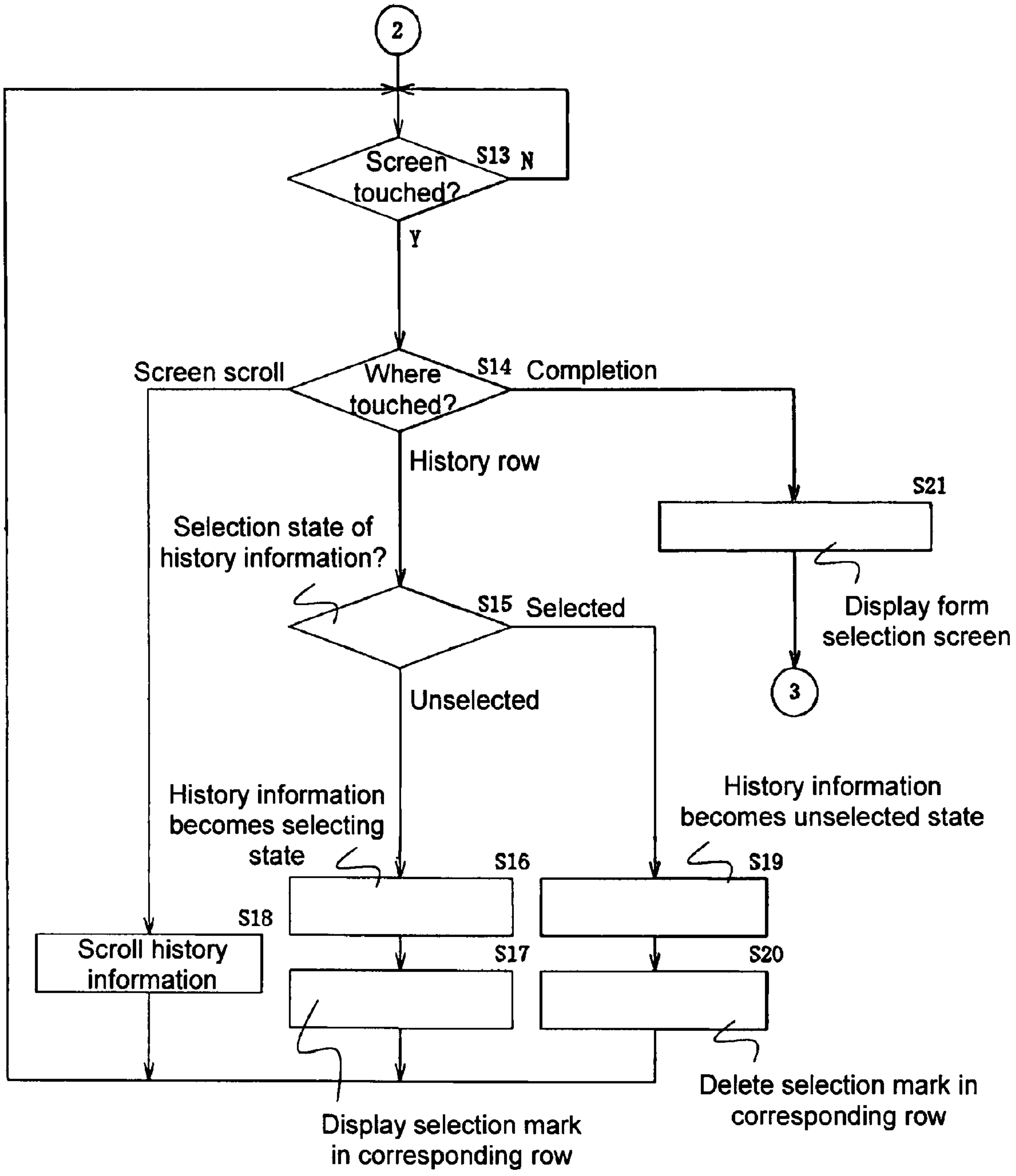
FIG. 13 is a flow chart showing an operation of selecting the history information according to the first embodiment of the present invention.
Figure 14:
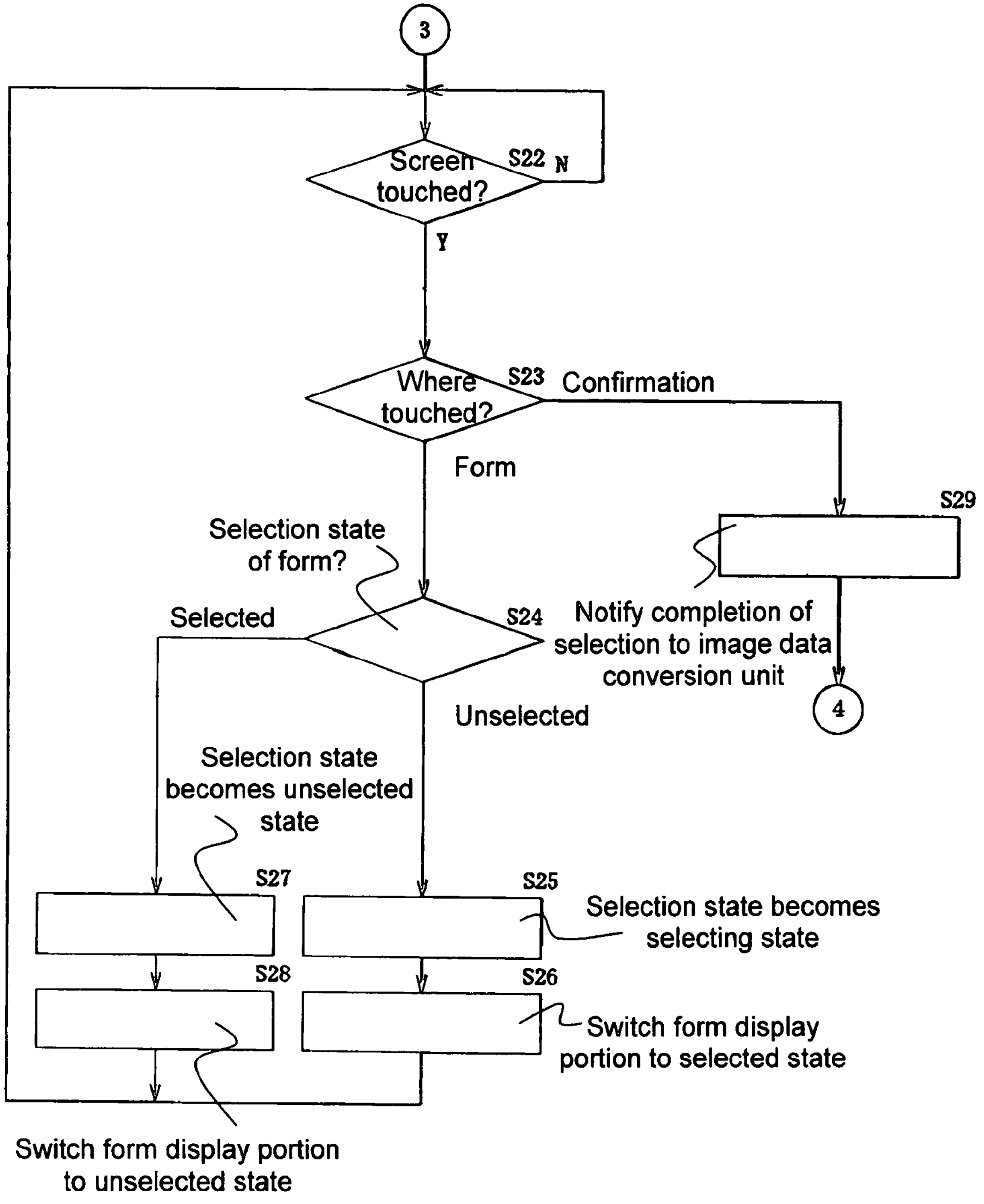
FIG. 14 is a flow chart showing an operation of selecting a form according to the first embodiment of the present invention.
Figure 15:
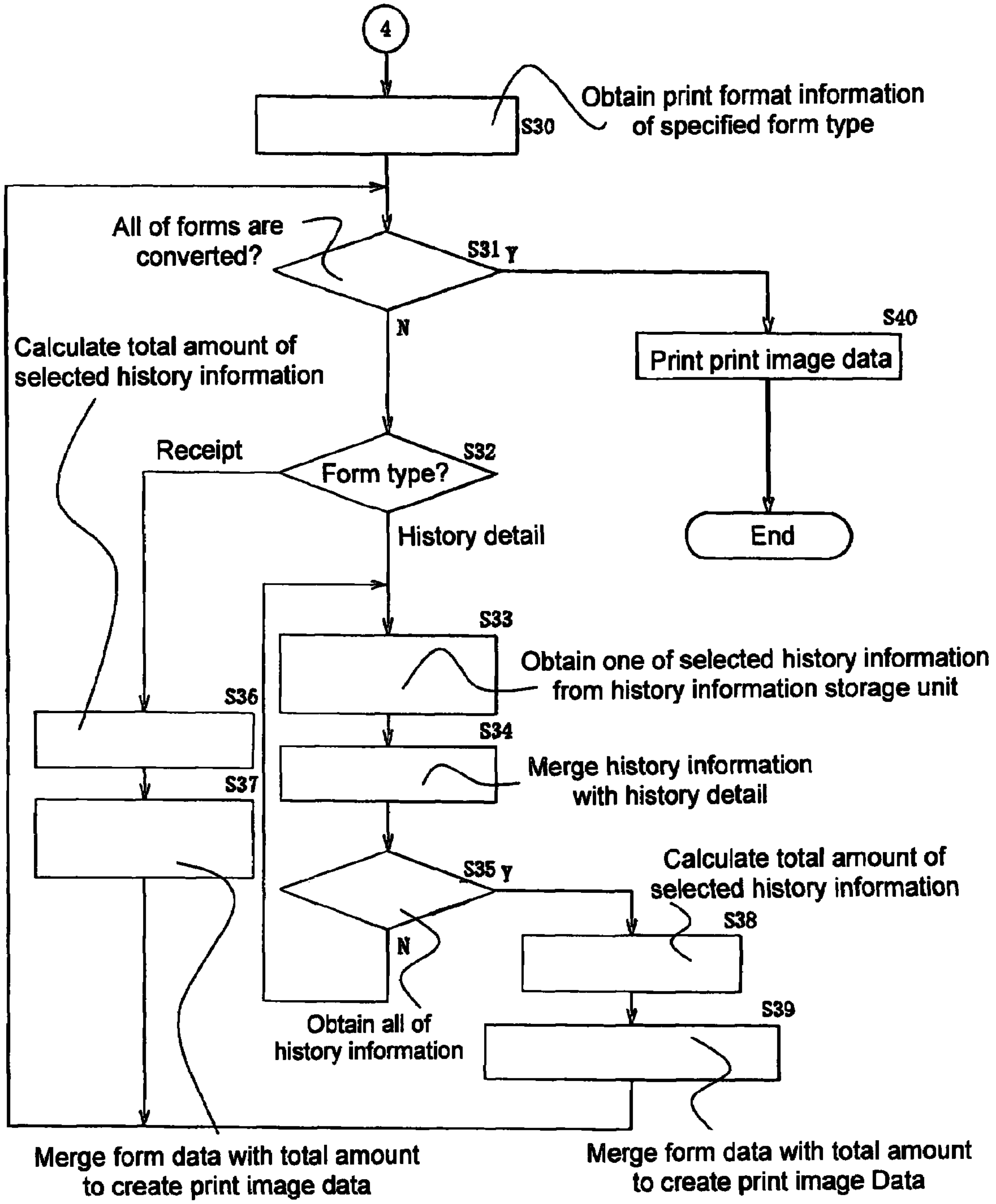
FIG. 15 is a flow chart showing an operation of creating print image data according to the first embodiment of the present invention.

Further, FIG. 13 is a flow chart showing an operation of selecting the history information according to the first embodiment of the present invention. FIG. 14 is a flow chart showing an operation of selecting the form according to the first embodiment of the present invention. FIG. 15 is a flow chart showing an operation of creating print image data according to the first embodiment of the present invention.

When the user holds the medium 33 as the money card over the reading unit 11, the reading unit 11 reads the card ID of the medium 33 as the identification information thereof. Then, the information communication unit 12 sends the card ID to the history information server 31, so that the information communication unit 12 obtains the history information corresponding to the card ID from the history information server 31 through the network 32. Upon receiving the card ID, the history information server 31 searches the card IDs stored in a card information database, and determines whether the card ID received from the information communication unit 12 exists in the card information database to confirm that the medium 33 is valid (valid card).

When the card ID received from the information communication unit 12 does not exist in the card information database, the history information server 31 determines that the medium 33 is invalid, and sends the signal "0" indicating the invalidity to the information communication unit 12. As a result, the information communication unit 12 notifies the panel unit 13 that the medium 33 is an invalid card, so that the panel unit 13 displays the warning screen 48 shown in FIG. 9.

When the card ID received from the information communication unit 12 exists in the card information database, the history information server 31 determines that the medium 33 is valid, and sends the signal "1" indicating the validity to the information communication unit 12. As a result, the information communication unit 12 notifies the panel unit 13 that the medium 33 is a valid card, and requests the history information server 31 to obtain the history information corresponding to the card ID.

In the next step, the history information server 31 determines whether there is the history information corresponding to the card ID. When there is the history information corresponding to the card ID, the history information server 31 retrieves the history information corresponding to the card ID from the history information database 41*a* shown in FIG. 2(*a*), and sends the history information to the information communication unit 12. As a result, the history information storage unit 14 stores and holds the history information received by the information communication unit 12 from the history information server 31.

As described above, the history information database 41*a* stores the history information as the IDs such as the card ID, the product ID, and the payment destination ID. Accordingly, the history information storage unit 14 searches and obtains the product name using the product ID as a key from the product information database 41*c* of the history information server 31 shown in FIG. 2(*c*), and stores the product name in the product name column in the history information database 42*a* shown in FIG. 3(*a*).

Similarly, the history information storage unit 14 searches and obtains the user name using the card ID as a key from the card information database 41*b* of the history information server 31 shown in FIG. 2(*b*), and stores the user name in the user name column in the date database 42*b* shown in FIG. 3(*b*). Further, the history information storage unit 14 searches and obtains the payment destination name using the payment destination ID as a key from the payment destination information database 41*d* of the history information server 31 shown in FIG. 2(*d*), and stores the payment destination name in the payment destination name column in the payment destination information database 42*c* shown in FIG. 3(*c*).

In the embodiment, before the history information storage unit 14 searches the payment destination information database 41*d* shown in FIG. 2(*d*), the history information storage unit 14 searches the payment destination ID column in the history information database 42*a* shown in FIG. 3(*a*). When the payment destination ID exists in the history information database 42*a*, the history information storage unit 14 does not obtain the payment destination name from the payment destination information database 42*c*.

In the next step, the history selection unit 15 reads the history information from the history information storage unit 14 and sends the history information to the panel unit 13, so that the panel unit 13 displays the display screen 43 shown in FIG. 4 for displaying the history information.

When there is no history information corresponding to the card ID in the history information server 31, the information communication unit 12 notifies the panel unit 13 that there is no history information. As a result, the panel unit 13 displays the warning screen 49 shown in FIG. 10 for warning that there is no history information. When the user pushes the OK button shown in the warning screen 48 (FIG. 9) or the warning screen 49 (FIG. 10), the communication terminal device 10 becomes an idle state.

When the panel unit 13 displays the display screen 43 shown in FIG. 4 for displaying the history information, the panel unit 13 becomes an idle state until the user touches the screen. When the user touches the screen, the next operation is selected according to a position where the user touches the screen.

In particular, when the user touches the screen scroll, i.e., the upward scroll button or the downward scroll button, the panel unit 13 scrolls the history information. That is, the panel unit 13 retrieves the history information not displayed on the screen from the history information storage unit 14 through the history selection unit 15, and displays the history information in the list one more time.

When the user touches a history row, i.e., a row corresponding to specific history information, the panel unit 13 notifies the history selection unit 15 of the history row touched by the user as a specified row. As a result, the history selection unit 15 determines the selection state of the history information corresponding to the specified row.

When the selection state of the history information corresponding to the specified row is the unselected state, the history selection unit 15 switches the selection state of the history information to the selected state ("1"), and notifies the panel unit 13 of the selection state thus updated. When the selection state of the history information corresponding to the specified row is the selected state, the history selection unit 15 switches the selection state of the history information to the unselected state ("0"), and notifies the panel unit 13 of the selection state thus updated.

Accordingly, the panel unit 13 updates the selection column of the history information in the display screen 43 according to the selection state notified from the history selection unit 15. That is, when the selection state thus updated is the selected state, the panel unit 13 displays a selection mark, i.e., the check mark, in the corresponding row. When the selection state thus updated is the unselected state, the panel unit 13 deletes the selection mark, i.e., the check mark, in the corresponding row.

When the user touches the complete button for directing completion of the selection of the history information, the panel unit 13 retrieves a form selection screen from the form storage unit 16, and displays the form selection screen in the display screen 44 shown in FIG. 5. Then, the panel unit 13 becomes the idle state until the user touches the screen. When the user touches the screen, the next operation is selected according to a position where the user touches the screen.

In particular, when the user touches one of the buttons indicating the printable forms such as the history detail, the receipt, and the invoice, the panel unit 13 notifies the form selection unit 21 that one of the forms is specified. As a result, the form selection unit 21 determines the selection state of the form thus specified.

When the selection state of the form thus specified is the unselected state, the form selection unit 21 switches the selection state of the history information to the selected state ("1"), and notifies the panel unit 13 of the selection state thus updated. When the selection state of the form thus specified is the selected state, the history selection unit 15 switches the selection state of the history information to the unselected state ("0"), and notifies the panel unit 13 of the selection state thus updated.

Accordingly, the panel unit 13 changes a frame color of the button of the history detail, the receipt, or the invoice in the display screen 44 according to the selection state notified from the form selection unit 21. That is, when the selection state thus updated is the selected state, the panel unit 13 changes the frame color to a color indicating the selected state, that is, a form display portion is changed to the selected state. When the selection state thus updated is the unselected state, the panel unit 13 changes the frame color to a color indicating the unselected state, that is, the form display portion is changed to the unselected state.

When the user touches the confirmation button, the form selection unit 21 notifies the image data conversion unit 23 that the selection of the form is completed.

In the next step, the image data conversion unit 23 sequentially refers to the selection states of the form types in the print format information stored in the form storage unit 16 shown in FIG. 6, and retrieves the print format information of the form type in the selected state. Then, the image data conversion unit 23 determines whether all of the form types in the selected state are converted to the print image data, that is, all of the forms thus specified are converted. When all of the form types in the selected state are not converted, the form type in the selected state is determined.

In the embodiment, contents to be printed depend on the form types. In the specification, only the following two cases are explained: a first case that the form type in the selected state is the receipt, and a second case that the form type in the selected state is the history detail.

In the first case that the form type in the selected state is the receipt, the amount calculation unit 22 refers to the history information storage unit 14, and calculates a total of the amounts of the history information indicating the selection state "1" in the history information database 42*a*. That is, the total amount of the history information thus selected is calculated. Then, the image data conversion unit 23 merges the print format information, i.e., the form data, with the total amount to create the print image data.

In the first case, the print image data is image data of the receipt for printing the receipt 47 shown in FIG. 8. The image data of the receipt 47 is form data based on the page description language including fixed texts such as "Receipt", "Attention", "Amount", and "Date". Further, the image data conversion unit 23 internally creates contents of a print job to be sent to the printing unit 24.

In particular, after the page description language specifying the form data is created, the image data conversion unit 23 creates a coordinate position specifying command for printing a name of a payer in an attention portion of the receipt 47. Then, the image data conversion unit 23 creates a command for printing the user name stored in the date database 42*b* shown in FIG. 3(*b*) at a coordinate position specified by the coordinate position specifying command.

Further, the image data conversion unit 23 creates a coordinate position specifying command for printing the total amount in an amount portion of the receipt 47. Then, the image data conversion unit 23 retrieves the total amount from the amount calculation unit 22, and creates a command for printing the total amount as a text string. In this case, a monetary unit such as ¥ and $ is added to a head of the total amount, and a comma is added every three digits.

Further, the image data conversion unit 23 creates a coordinate position specifying command for printing a four-digit year, a two-digit month, and a two-digit date in a date portion of the receipt 47. Then, the image data conversion unit 23 creates a command for printing the four-digit year, the two-digit month, and the two-digit date included in the obtained date stored in the date database 42*b* shown in FIG. 3(*b*) at a coordinate position specified by the coordinate position specifying command. Still further, the image data conversion unit 23 creates a coordinate position specifying command for printing the payment destination in an issuer name portion of the receipt 47. Then, the image data conversion unit 23 creates a command for printing the payment destination stored in the payment destination information database 42*c* shown in FIG. 3(*c*) at a coordinate position specified by the coordinate position specifying command.

In the second case that the form type in the selected state is the history detail, the amount calculation unit 22 refers to the history information storage unit 14, and retrieves the activity date, the product name, and the amount related to the history information indicating the selection state "1" in the history information database 42*a*. That is, one of the history information thus selected is retrieved. Then, the image data conversion unit 23 merges the history information with the history detail.

In the second case, the image data conversion unit 23 creates the print image data for printing the history detail 46 shown in FIG. 7. The image data of the history detail 46 is form data based on the page description language including a coordinate position specifying command and a text string print command of "History Detail"; "Date"; "Issuance Date:", i.e., "Year", "Month", and "Date" of the issuance date; and the issuer. Further, the image data conversion unit 23 internally creates contents of a print job to be sent to the printing unit 24.

In particular, after the page description language specifying the form data is created, the image data conversion unit 23 creates a command for printing variable data of the history information in the selected state and not included in the form data. Further, the image data conversion unit 23 creates a coordinate position specifying command for printing for printing a four-digit year, a two-digit month, and a two-digit date in an issuance date portion of the history detail 46.

Further, the image data conversion unit 23 creates a coordinate position specifying command for specifying a print start position of the date corresponding to the first one of the history information of the history detail 46. Then, the image data conversion unit 23 retrieves the date from the activity dates included in the history information database 42*a* shown in FIG. 3(*a*). Afterward, the image data conversion unit 23 creates a command for printing the data as a text string from the print start position.

Further, the image data conversion unit 23 creates a coordinate position specifying command for specifying a print start position of the product name corresponding to the first one of the history information of the history detail 46. Then, the image data conversion unit 23 retrieves the product name included in the history information database 42*a* shown in FIG. 3(*a*), and creates a command for printing the product name as a text string from the print start position.

Further, the image data conversion unit 23 creates a coordinate position specifying command for specifying a print start position of the amount corresponding to the first one of the history information of the history detail 46. Then, the image data conversion unit 23 retrieves the amount included in the history information database 42*a* shown in FIG. 3(*a*), and creates a command for printing the amount as a text string from the print start position.

In the next step, the image data conversion unit 23 determines whether all of the history information in the selection state of "1" in the history information database 42*a* shown in FIG. 3(*a*) is merged with the history detail 46. That is, the image data conversion unit 23 determines whether all of the history information is obtained. Then, the image data conversion unit 23 repeats the operations described above until all of the history information in the selection state of "1" is merged with the history detail 46.

After all of the history information in the selection state of "1" is merged with the history detail 46, the amount calculation unit 22 refers to the history information storage unit 14, and calculates the total amount of the history information in the selection state of "1" in the history information database 42*a* shown in FIG. 3(*a*). That is, the total amount of the history information thus selected is calculated.

In the next step, the image data conversion unit 23 merges the form data with the total amount to create the print image data. In this case, the image data conversion unit 23 creates a coordinate position specifying command for specifying a print start position of the total amount in a total amount portion of the history detail 46. Then, the image data conversion unit 23 creates a command for printing the total amount as a text string from the print start position. Accordingly, the print image data for printing the history detail 46 shown in FIG. 7 is created.

In the next step, when the image data conversion unit 23 determines whether all of the forms are converted, that is, all types of the forms in the selected state are converted, the image data conversion unit 23 sends the print image data to the printing unit 24. Accordingly, the printing unit 24 prints the print image data on a print medium such as a paper sheet.

The flow chart shown in FIG. 11 will be explained next. In step S1, the medium 33 is held over the reading unit 11. In step S2, the card ID is read.

The flow chart shown in FIG. 12 will be explained next. In step S3, the card ID is sent to the history information server 31. In step S4, it is determined whether the card is valid. When the card is valid, the process proceeds to step S5. When the card is not valid, the process proceeds to step S9. In step S5, the history information server 31 is requested for the history information. In step S6, it is determined whether there is the history information. When there is the history information, the process proceeds to step S7. When there is no history information, the process proceeds to step S10.

In step S7, the history information is stored. In step S8, the panel unit 13 displays the history information. In step S9, the panel unit 13 displays that the card is not valid. In step S10, the panel unit 13 displays that there is no history information. In step S11, it is determined whether the OK button is pushed. When the OK button is pushed, the process proceeds to step S12. When the OK button is not pushed, the process stops. In step S12, the process becomes the idle state, and is completed.

The flow chart shown in FIG. 13 will be explained next. In step S13, it is determined whether the screen is touched. When the screen is touched, the process proceeds to step S14. When the screen is not touched, the process becomes the idle state. In step S14, it is determined which position of the screen is touched. When the screen scroll is touched, the process proceeds to step S18. When the history row is touched, the process proceeds to step S15. When the completion button is touched, the process proceeds to step S21.

In step S15, the selection state of the history information is determined. When the history information is not selected, the process proceeds to step S16. When the history information is selected, the process proceeds to step S19.

In step S16, the history information becomes the selecting state. In step S17, the selection mark is displayed in the corresponding row. In step S18, the history information is scrolled. In step S19, the history information becomes the unselected state. In step S20, the selection mark in the corresponding row is deleted. In step S21, the form selection screen is displayed.

The flow chart shown in FIG. 14 will be explained next. In step S22, it is determined whether the screen is touched. When the screen is touched, the process proceeds to step S23. When the screen is not touched, the process becomes the idle state. In step S23, it is determined which position of the screen is touched. When the form is touched, the process proceeds to step S24. When the confirmation button is touched, the process proceeds to step S29.

In step S24, the selection state of the history information is determined. When the history information is not selected, the process proceeds to step S25. When the history information is selected, the process proceeds to step S27.

In step S25, the form becomes the selecting state. In step S26, the form display portion is switched to the selected state. In step S27, the form becomes the unselected state. In step S28, the form display portion is switched to the unselected state. In step S29, the completion of the selection is notified to the image data conversion unit 23.

The flow chart shown in FIG. 15 will be explained next. In step S30, the print format information of the form type thus specified is obtained. In step S31, it is determined whether all of the forms thus specified are to be converted. When all of the forms thus specified are not to be converted, the process proceeds to step S32. When all of the forms thus specified are to be converted, the process proceeds to step S40.

In step S32, the form type is determined. When the form type is the receipt, the process proceeds to step S36. When the form type is the history detail, the process proceeds to step S33. In step S33, one of the history information thus selected is obtained from the history information storage unit 14. In step S34, the history information is merged with the history detail.

In step S35, it is determined whether all of the history information thus specified is obtained. When all of the history information is not obtained, the process returns to step S33. When all of the history information is obtained, the process proceeds to step S38. In step S36 the total amount of the history information thus selected is calculated. In step S37, the form data is merged with the total amount to create the print image data. In step S38 the total amount of the history information thus selected is calculated. In step S39, the form data is merged with the total amount to create the print image data. In step S40, the print image data is printed, and the process is completed.

As described above, in the embodiment, desired history information is selected from the history information in the medium 33. Then, a desired print format is selected from a plurality of print formats, so that the history information thus selected is merged with the print format thus selected for printing. Accordingly, it is possible to efficiently print the history information for various purposes.

Second Embodiment

A second embodiment of the present invention will be explained next. Components in the second embodiment similar to those in the first embodiment are designated with the same reference numerals, and explanations thereof are omitted. The components similar to those in the first embodiment provide similar effects, and explanations thereof are omitted.

Figure 16:
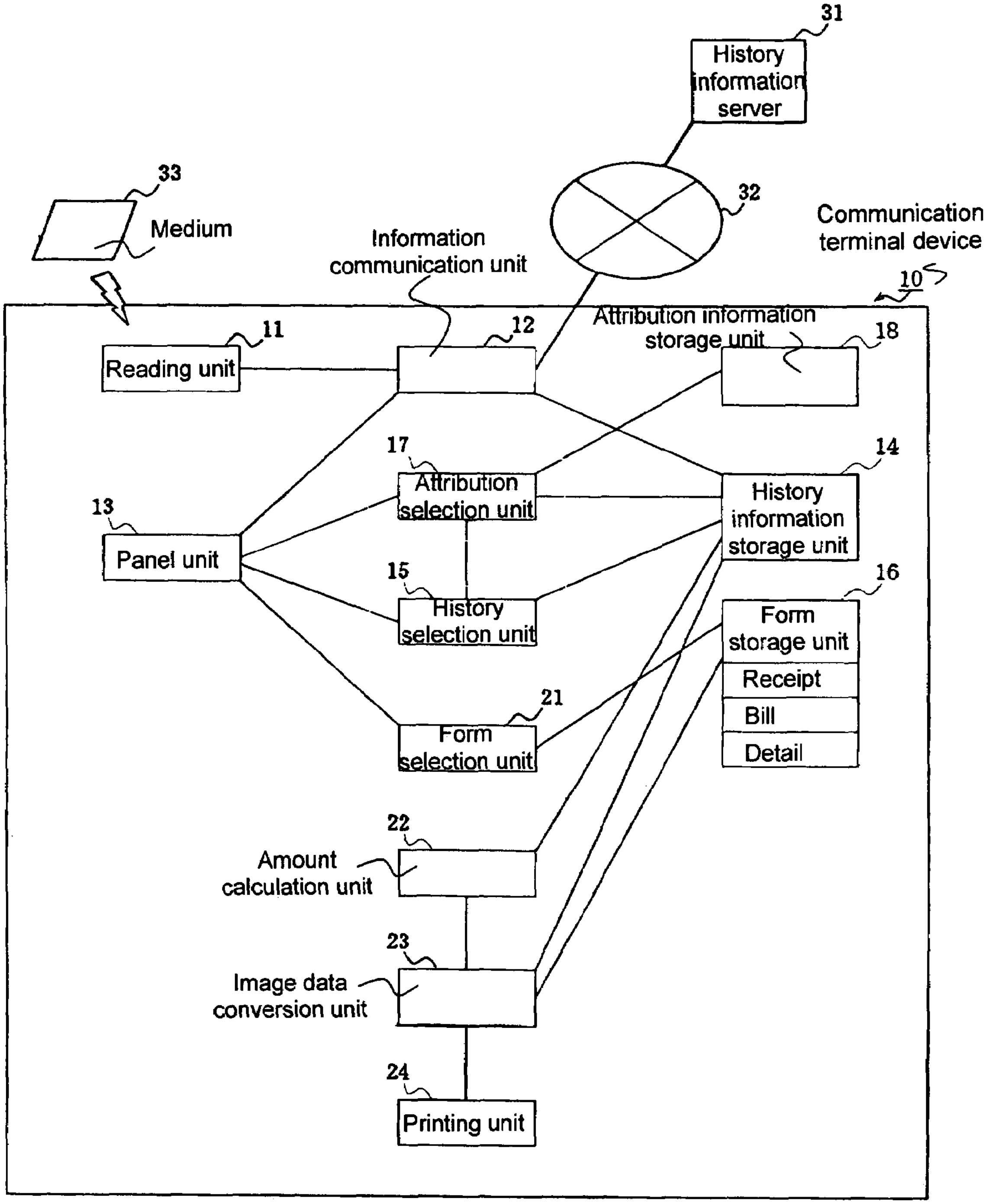
FIG. 16 is a schematic block diagram showing a communication terminal device according to a second embodiment of the present invention.
Figure 17:
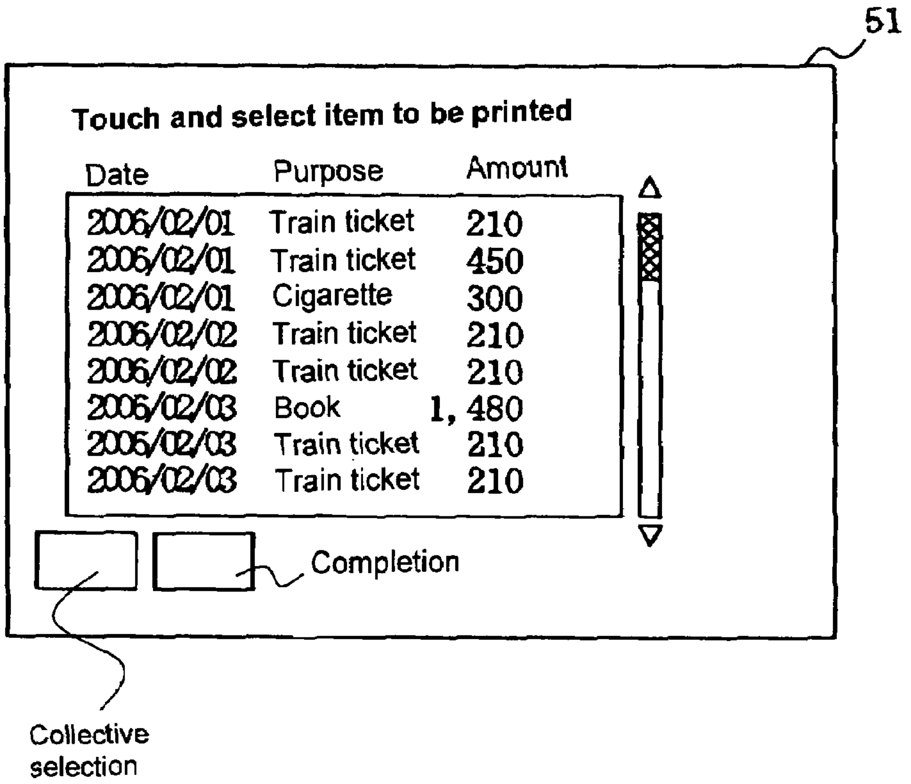
FIG. 17 is a schematic view showing an example of a history selection screen according to the second embodiment of the present invention.
Figure 18:
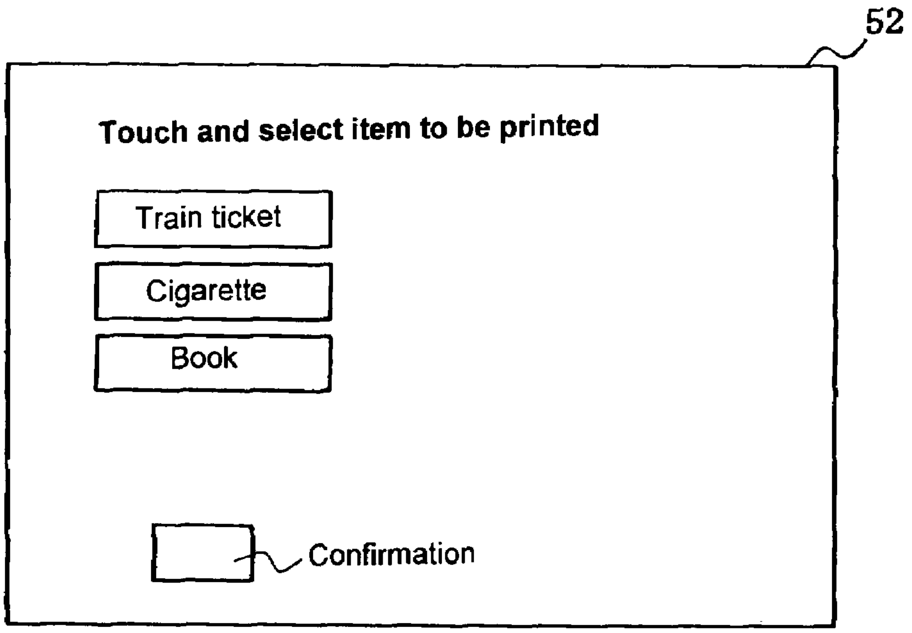
FIG. 18 is a schematic view showing an example of a print format selection screen according to the second embodiment of the present invention.
Figure 19:
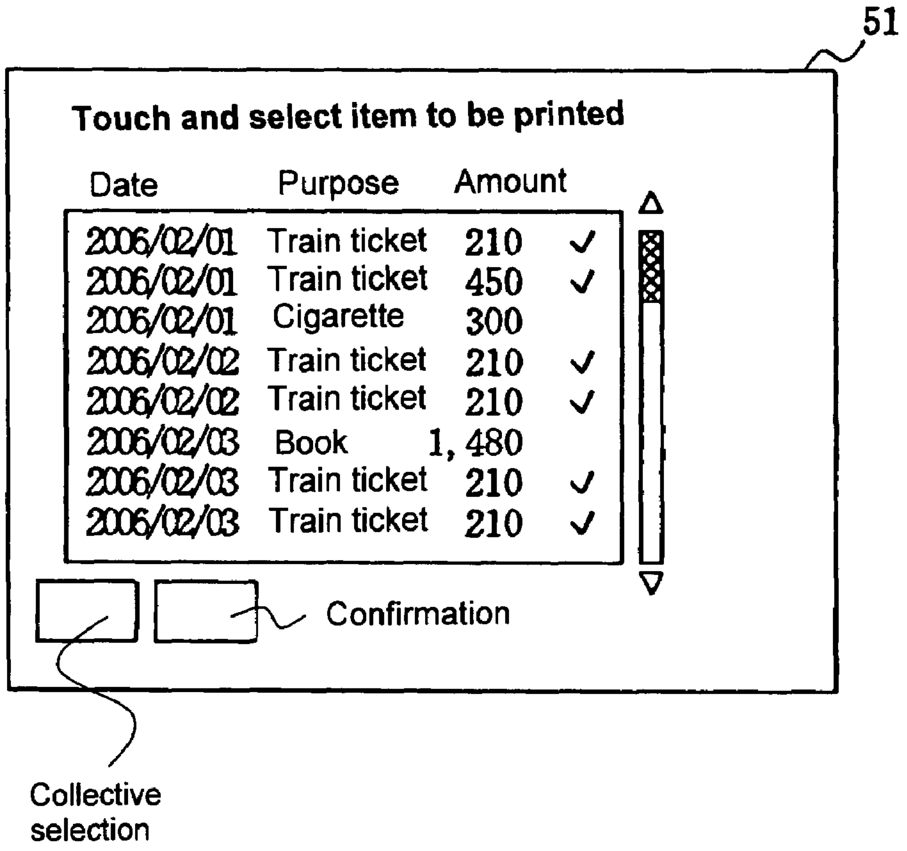
FIG. 19 is a schematic view showing an example of the history selection screen after an attribution is selected according to the second embodiment of the present invention.

FIG. 16 is a schematic block diagram showing the communication terminal device 10 according to the second embodiment of the present invention. FIG. 17 is a schematic view showing an example of a history selection screen according to the second embodiment of the present invention. FIG. 18 is a schematic view showing an example of a print format selection screen according to the second embodiment of the present invention. FIG. 19 is a schematic view showing an example of the history selection screen after an attribution is selected according to the second embodiment of the present invention.

As shown in FIG. 16, in the second embodiment, the communication terminal device 10 additionally includes an attribution selection unit 17 and an attribution information storage unit 18. The attribution may include, for example, an item in the product name when a search key is the product; an item in the payment destination when a search key is the payment destination; and an item in the date when a search key is the activity date.

In the embodiment, the attribution selection unit 17 refers to the history information storage unit 14 and selects the attribution using the search key, for example, the product ID. Further, the attribution information storage unit 18 stores a result thus retrieved by the attribution selection unit 17 in a product ID table.

In particular, the attribution selection unit 17 retrieves the attribution using the product ID as the search key from the history information database 42*a* in the history information storage unit 14 shown in FIG. 3(*a*) relative to the medium 33. Then, the attribution selection unit 17 obtains the product ID and the product name corresponding to the product ID, and the attribution information storage unit 18 stores the product ID and the product name in the product ID table.

FIG. 17 is a schematic view showing an example of a display screen 51 displayed on the panel unit 13 for selecting the history information to be printed. The display screen 51 is similar to the display screen 43 shown in FIG. 4 in the first embodiment. In addition to the items shown in the display screen 43, the display screen 51 shows a collective selection button for collectively selecting the history information having a specific attribution.

FIG. 18 is a schematic view showing an example of a display screen 52 displayed on the panel unit 13 for selecting an attribution of the history information. When the user touches the display screen 52, the attribution is selected. As shown in FIG. 17, the display screen 52 shows selection buttons such as train ticket, cigarette, and book, and a confirmation button.

FIG. 19 is a schematic view showing an example of the display screen 51 similar to the display screen 51 shown in FIG. 17 after an attribution is selected. Other components are the same as those in the first embodiment, and explanation thereof are omitted.

Figure 20:
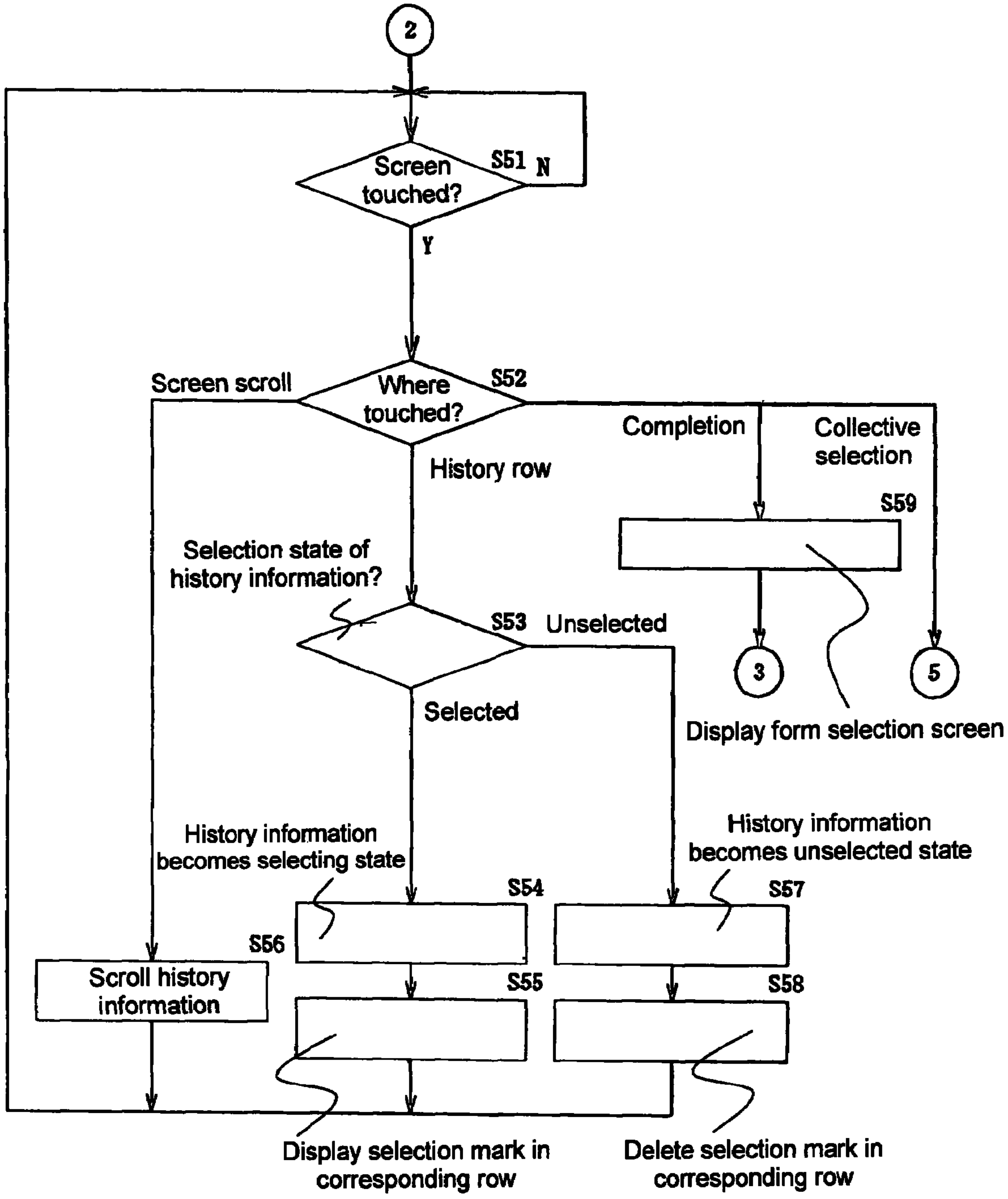
FIG. 20 is a flow chart No. 1 showing an operation of selecting history information according to the second embodiment of the present invention.
Figure 21:
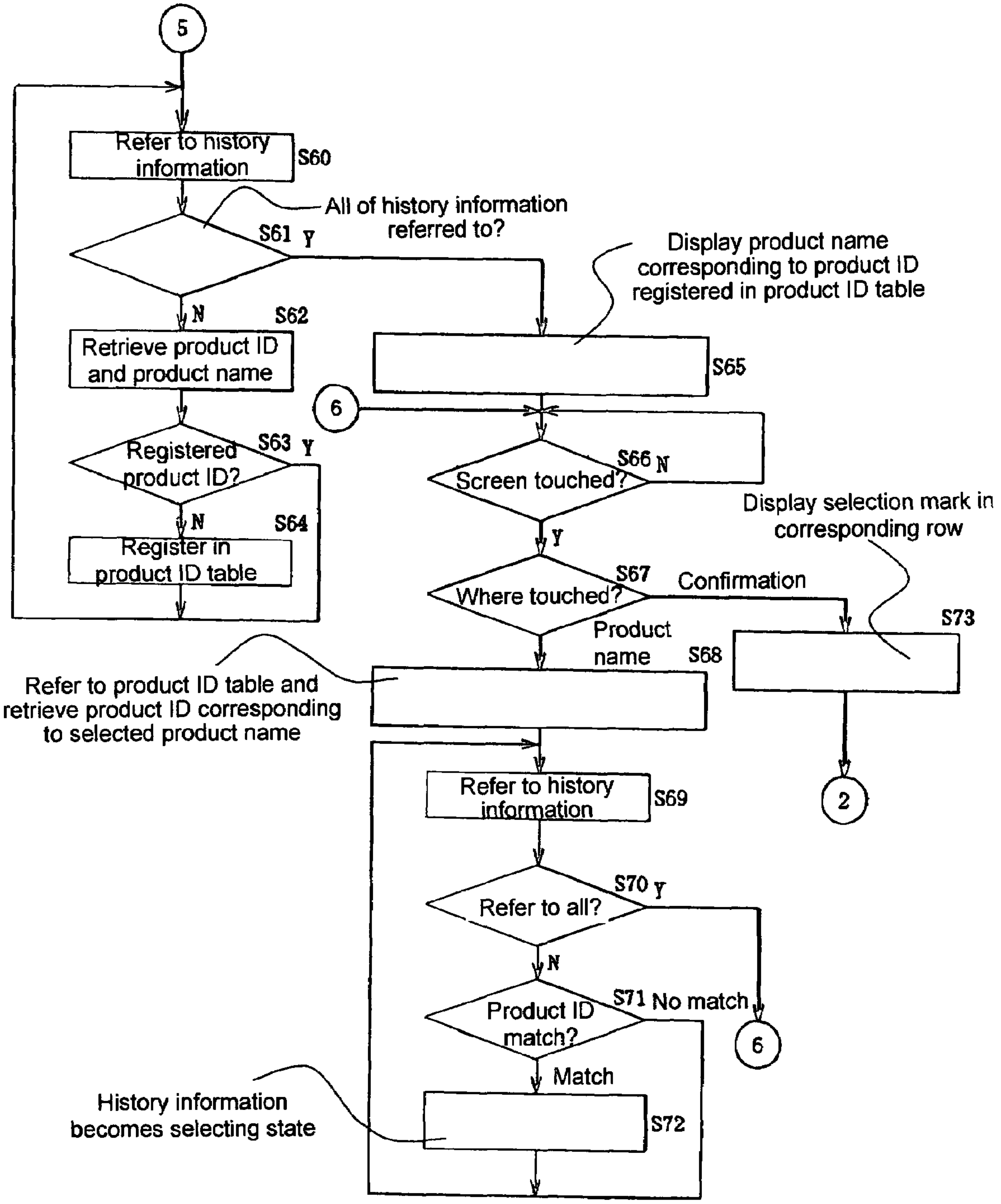
FIG. 21 is a flow chart No. 2 showing the operation of selecting the history information according to the second embodiment of the present invention.

An operation of the communication terminal device 10 will be explained next. FIG. 20 is a flow chart No. 1 showing an operation of selecting the history information according to the second embodiment of the present invention. FIG. 21 is a flow chart No. 2 showing the operation of selecting the history information according to the second embodiment of the present invention.

The process from when the user holds the medium 33 over the reading unit 11 to when the panel unit 13 displays the history information, corresponding to the flow charts shown in FIG. 11 and FIG. 12, is the same as that in the first embodiment, and an explanation thereof is omitted.

When the panel unit 13 displays the display screen 51 shown in FIG. 17 for displaying the history information, the panel unit 13 becomes an idle state until the user touches the screen. When the user touches the screen, the next operation is selected according to a position where the user touches the screen. When the user touches the row corresponding to the history information, i.e., the row corresponding to specific history information, or the complete button for directing completion of the selection of the history information, the operation is the same as that in the first embodiment, and an explanation thereof is omitted.

When the user touches the collective button for collectively selecting the history information having a specific attribution, the panel unit 13 notifies the attribution selection unit 17 of start of the collective selection. Accordingly, the attribution selection unit 17 initializes the product ID table in the attribution information storage unit 18, and refers to the history information from the first one stored in the history information database 42*a* of the history information storage unit 14 shown in FIG. 3(*a*).

In particular, the attribution selection unit 17 retrieves the product ID and the corresponding product name from the history information database 42*a*, and determines whether the product ID thus retrieved is a registered product ID. When the product ID thus retrieved is not the registered product ID, the product ID is registered in the product ID table in the attribution information storage unit 18.

That is, the attribution selection unit 17 searches the product ID table to determine whether the product ID matching to the product ID in the history information database 42*a* exists.

When the product ID does not exist, the product ID and the corresponding product name are registered in the product ID table in the attribution information storage unit 18. This process is repeated for all of the history information stored in the history information database 42*a*.

In the next step, the panel unit 13 retrieves the product name from the product ID table stored in the attribution information storage unit 18 through the attribution selection unit 17, so that the product name is displayed on the display screen 52 or the attribution selection screen shown in FIG. 18. That is, the product name corresponding to the product ID registered in the product ID table is displayed on the display screen 52. Then, the panel unit 13 becomes the idle state until the user touches the display screen 52. When the user touches the screen, the next operation is selected according to a position where the user touches the screen.

In the next step, when the user touches the selection buttons such as train ticket, cigarette, and book for selecting the attribution, the attribution selection unit 17 retrieves the product ID corresponding to the attribution thus selected from the product ID table in the attribution information storage unit 18, and notifies the history selection unit 15 of the product ID. That is, the attribution selection unit 17 refers to the product ID table, and retrieves the product ID corresponding to the product name thus selected.

In the next step, the history selection unit 15 refers to the history information from the first one stored in the history information database 42*a* of the history information storage unit 14 shown in FIG. 3(*a*). When the product ID corresponding to the product ID collectively selected exists in the history information database 42*a*, the selection state of the corresponding history information becomes "1". That is, it is determined whether the product ID matches the product ID in the history information database 42*a*, and the history information becomes the selected state when the product ID matches. This process is repeated for all of the history information stored in the history information database 42*a*.

After all of the history information is referred and the selection state is updated, the panel unit 13 is notified. Accordingly, the panel unit 13 displays the display screen 52 or the attribution selection screen one more time. Until the confirmation button is touched, the collective selection process of the attribution described above is repeated.

When the user touches the confirmation button on the display screen 52, the panel unit 13 refers to the history information database 42*a* after the completion of the collective selection. Then, the panel unit 13 displays the display screen 51 shown in FIG. 19 showing the history information having the selection state of "1" indicating the selected state. The remaining process is the same as that in the first embodiment, and explanation thereof is omitted.

The flow chart shown in FIG. 20 will be explained next. In step S51, it is determined whether the screen is touched. When the screen is touched, the process proceeds to step S52. When the screen is not touched, the process becomes the idle state. In step S52, it is determined which position of the screen is touched. When the screen scroll is touched, the process proceeds to step S56. When the history row is touched, the process proceeds to step S53. When the completion button is touched, the process proceeds to step S59. When the collective selection button is touched, the process proceeds to step S60.

In step S53, the selection state of the history information is determined. When the history information is not selected, the process proceeds to step S54. When the history information is selected, the process proceeds to step S57.

In step S54, the history information becomes the selecting state. In step S55, the selection mark is displayed in the corresponding row. In step S56, the history information is scrolled. In step S57, the history information becomes the unselected state. In step S58, the selection mark in the corresponding row is deleted. In step S59, the form selection screen is displayed.

The flow chart shown in FIG. 21 will be explained next. In step S60, the history information is referred to. In step S61, it is determined whether all of the history information is referred to. When all of the history information is referred to, the process proceeds to step S65. When all of the history information is not referred to, the process proceeds to step S62.

In step S62, the product ID and the product name are retrieved. In step S63, it is determined whether the product ID is registered. When the product ID is registered, the process returns to step S60. When the product ID is not registered, the process proceeds to step S64. In step S64, the product ID is registered in the product ID table. In step S65, the product name corresponding to the product ID registered in the product ID table is displayed.

In step S66, it is determined whether the screen is touched. When the screen is touched, the process proceeds to step S67. When the screen is not touched, the process becomes the idle state. In step S67, it is determined which position of the screen is touched. When the product name is touched, the process proceeds to step S68. When the confirmation button is touched, the process proceeds to step S73.

In step S68, the product ID table is referred to, and the product ID corresponding to the product name thus selected is retrieved. In step S69, the history information is referred to. In step S70, it is determined whether all of the history information is referred to. When all of the history information is referred to, the process proceeds to step S66. When all of the history information is not referred to, the process proceeds to step S71.

In step S71, it is determined whether the product ID matches. When the product ID matches, the process proceeds to step S72. When the product ID does not match, the process returns to step S69. In step S72, the history information becomes the selecting state. In step S73, the check mark is displayed in the corresponding history row.

As described above, in the embodiment, it is possible to collectively select the history information having the same attribution instead of selecting the history information one by one, thereby making the input operation easy.

In the first and second embodiments, the communication terminal device 10 is applicable to a printer, a multi function printer (MFP), a facsimile, a copier, and the likes. Further, in addition to the IC card of non-contact type, the medium 33 is applicable to a mobile phone having a payment function, a magnetic card, a pre-paid card, and the likes.

The disclosure of Japanese Patent Application No. 2006-148614, filed on May 29, 2006, is incorporated in the application by reference.

While the invention has been explained with reference to the specific embodiments of the invention, the explanation is illustrative and the invention is limited only by the appended claims.

What is claimed is:

1. A communication terminal device to be connected to an information processing apparatus that controls history information of a medium in which identification information is stored, comprising:

a reading unit for reading the identification information from the medium;

a communication unit for transmitting the identification information to the information processing apparatus and receiving the history information corresponding to the identification information from the information processing apparatus;

a display unit for displaying the history information;

a history selection unit for selecting specific history information from the history information;

a format storage unit for storing a plurality of print formats;

a format selection unit for selecting a specific print format from the print formats;

an image data conversion unit for retrieving specific information from the history information according to the specific print format and converting the specific information to a specific print item attributed to the specific information to create image data; and a printing unit for printing the image data according to the specific print format.

2. The communication terminal device according to claim 1, wherein said history selection unit is adopted to collectively select the history information having a specific attribution.

3. The communication terminal device according to claim 1, wherein said reading unit is adopted to read the identification information from the medium having an electronic money transaction function.

4. The communication terminal device according to claim 1, wherein said format storage unit is adopted to store the print formats including a history detail and a receipt.

5. The communication terminal device according to claim 1, further comprising an amount calculation unit for calculating a total amount with respect to the history information.

6. The communication terminal device according to claim 1, further comprising an image data conversion unit for creating image data.

7. The communication terminal device according to claim 1, further comprising an attribution selection unit for selecting an attribution with respect to the history information.

8. The communication terminal device according to claim 1, wherein said format selection unit selects the specific print format from the print formats including data of a text string in a standard format portion independent from a ruled line portion or individual information of a user.

9. The communication terminal device according to claim 1, wherein said format selection unit selects the specific print format from the print formats formed with a page description language.

10. The communication terminal device according to claim 1, wherein said format selection unit selects the specific print format from the print formats including spreadsheet data formed of a table format, said printing unit printing the specific history information according to a position of the table format.

11. The communication terminal device according to claim 1, wherein said format selection unit selects a plurality of specific print formats from the print formats, said printing unit printing unit merging the specific history information with each of the specific print formats so that the printing unit prints the specific history information according to each of the specific print formats.

12. The communication terminal device according to claim 1, wherein said communication unit receives the history information including a plurality of items, said history selection unit selecting the items from the history information, said printing unit printing unit merging information the items with the specific print format.

13. The communication terminal device according to claim 1, wherein said display unit displays information of the printing formats.

14. The communication terminal device according to claim 1, further comprising a determining unit for determining whether the medium is valid, said display unit displaying the history information when the history information exists and the determining unit determines that the medium is valid, said display unit displaying that the history information does not exist when the history information does not exist, said display unit displaying that the medium is invalid when the determining unit determines that the medium is invalid.

15. The communication terminal device according to claim 1, wherein said image data conversion unit is arranged to retrieve a user name as the specific information and convert the user name to a name in an attention column as the specific print item.

16. The communication terminal device according to claim 1, wherein said image data conversion unit is arranged to retrieve an issuer name as the specific information and convert the issuer name to a destination name as the specific print item.

* * * * *